United States Patent [19]
Kimberley et al.

[11] Patent Number: 4,485,794
[45] Date of Patent: Dec. 4, 1984

[54] METHOD AND APPARATUS FOR CONTROLLING DIESEL ENGINE EXHAUST GAS RECIRCULATION PARTLY AS A FUNCTION OF EXHAUST PARTICULATE LEVEL

[75] Inventors: John A. Kimberley, East Granby; Robert H. Bullis, Avon, both of Conn.

[73] Assignee: United Technologies Diesel Systems, Inc., Springfield, Mass.

[21] Appl. No.: 571,409

[22] Filed: Jan. 17, 1984

Related U.S. Application Data

[63] Continuation-in-part of Ser. No. 432,500, Oct. 4, 1982, abandoned.

[51] Int. Cl.³ .............................................. F02M 25/06
[52] U.S. Cl. ................................... 123/569; 123/571; 123/568; 123/489
[58] Field of Search ............... 123/569, 571, 570, 489, 123/501, 568

[56] References Cited

U.S. PATENT DOCUMENTS

| | | | |
|---|---|---|---|
| 4,279,235 | 7/1981 | Flaig et al. | 123/569 |
| 4,381,748 | 5/1983 | Eckert et al. | 123/571 |
| 4,388,909 | 6/1983 | Ogasawara et al. | 123/569 |
| 4,397,283 | 8/1983 | Komaroff et al. | 123/501 X |

FOREIGN PATENT DOCUMENTS

| | | | |
|---|---|---|---|
| 2455777 | 8/1976 | Fed. Rep. of Germany | 123/571 |
| 2443582 | 8/1980 | France | 123/569 |

*Primary Examiner*—Wendell E. Burns
*Attorney, Agent, or Firm*—Stephen A. Schneeberger

[57] ABSTRACT

A method and apparatus for controlling the recirculation of exhaust gas in a diesel engine includes an EGR valve responsive to an EGR control signal for relatively opening and closing a recirculation duct to the passage of exhaust gas therethrough. A sensor provides a signal indicative of the level of particulates in the exhaust gas stream. Control circuitry responsive to various signals indicative of engine operating conditions, including the signal indicative of exhaust gas particulate level, provides an EGR control signal for regulating the EGR valve at least partly as a function of the sensed level of particulates in the exhaust gas stream. The engine operating condition signals typically are indicative of the speed of the engine or fuel injection pump, the engine load, and engine operating temperature. The particulate level signal is preferably provided by electrostatically sensing the passage of packets of charged particles by an electrically-passive, annular electrode positioned in or adjacent to the exhaust gas stream.

The control circuitry includes storage of open loop EGR valve control signals as a function of speed and load, as well as particulate objective signals also as a function of speed and load. The sensed exhaust gas particulate level is compared with the appropriate particulate objective signal for the development of an error signal, which error signal is then used in an adaptive manner to adjust the open loop EGR control signal in a direction to diminish the particulate error signal. Such adaptive control of the EGR control signal as a function of the exhaust gas particulate level is further advantageous because a predeterminable relationship exists between exhaust particulate levels and $NO_x$ levels as a function of percent EGR. EGR control may be inhibited by depressed engine temperature.

13 Claims, 5 Drawing Figures

METHOD AND APPARATUS FOR CONTROLLING DIESEL ENGINE EXHAUST GAS RECIRCULATION PARTLY AS A FUNCTION OF EXHAUST PARTICULATE LEVEL

DESCRIPTION

This application is a continuation-in-part of U.S. Ser. No. 432,500 filed Oct. 4, 1982, now abandoned.

TECHNICAL FIELD

The invention relates to a method and apparatus for controlling the recirculation of exhaust gas in a compression ignition, or diesel, engine, and more particuarly relates to an improvement in such controls.

BACKGROUND ART

Exhaust gas recirculation (hereinafter EGR) is used in automobile diesel engines to control the emission of oxides of nitrogen (hereinafter $NO_x$). In many instances, the amount of EGR applied to the engine is controlled or scheduled as a function of the induced air quantity entering the engine. While such an approach is fundamentally sound, it is difficult to implement because it requires either estimating or measuring the amount of airflow inducted into the engine. The maximum EGR is typically limited by exhaust smoke, or more precisely, exhaust particulate emissions. Because of this limitation, many systems increase the amount of EGR until the measured air/fuel ratio reaches a predetermined amount that decreases the oxides of nitrogen as much as possible while limiting the smoke emissions to some predetermined satisfactory maximum.

A recent U.S. Pat. No. 4,333,440 to Eheim describes an apparatus for controlling EGR in a diesel engine without resort to a measurement of the induced airflow or the air/fuel ratio. That system utilizes measurements of the speed and the fuel delivery quantities of a fuel injection pump for identifying and retrieving EGR control values stored in a memory as functions of the pump speed and fuel quantity values. The retrieved EGR values are utilized to control the EGR valve. Such a system, however, makes no provision for directly controlling the level of particulates emitted by the engine, which level may vary as a function of factors other than pump speed and fuel quantity. For instance, fuel quality, engine operating temperature, ambient air pressure and engine wear may cause variations in the level of particulate contained in the exhaust gas emissions for constant conditions of fuel pump speed and injection quantity.

Another U.S. Pat. No. 4,186,701 to Suzuki et al discloses an EGR control arrangement for maintaining an adequate balance between the suppression of $NO_x$ emission and the preservation of stable engine operation in a spark ignition engine. This balance is provided by monitoring the condition of combustion in the engine and developing therefrom a feedback signal for controlling the volume of recirculated exhaust gas. The feedback signal is provided by a probe which applies a voltage across a combustion chamber of the engine and uses the resulting ionic current as an indication of the combustion conditions. Specifically, the ionic current decreases as the amount of the retained combustion gas increases. The drawback to this approach as an EGR control resides in the fact that the probe measures combustion chamber conditions and not exhaust gas emissions. Reduction of $NO_x$ requires relatively high levels of recirculated exhaust gas yet reference to FIG. 2 of the Suzuki et al patent clearly reveals that the probe signal is of least sensitivity in that region.

Therefore, it is a principal object of the present invention to provide improved apparatus for controlling the recirculation of exhaust gas in a diesel engine. Specifically, it is desired to provide such control at least partly as a function of the level of particulates in the engine's exhaust gas stream.

It is a further object of the invention to provide an EGR system which provides improved control through use of a feedback sensor which measures exhaust gas emissions directly.

In accordance with the present invention, there is provided a method and apparatus for controlling the recirculation of exhaust gas in a diesel engine having an exhaust gas recirculation duct connected between an exhaust duct from the engine and the air intake duct to the engine. An EGR valve operatively associated with the recirculation duct is responsive to an EGR control signal for relatively opening and closing the recirculation duct to the passage of exhaust gas therethrough. A sensor is mounted in operative association with the exhaust gas stream passing through the exhaust duct for providing a signal indicative of the level of particulates in the exhaust gas stream. Control circuitry responsive to various signals indicative of engine operating conditions including the signal indicative of exhaust gas particulate level, provides an EGR control signal for regulating the EGR valve at least partly as a function of the sensed level of particulates in the exhaust gas stream. The engine operating condition signals to which the control circuitry responds typically are indicative of the speed of the engine or fuel injection pump, the engine load, and engine operating temperature. The particulate level signal is preferably provided by electrostatically sensing the passage of packets of charged particles by an electrically-passive, annular electrode positioned in or adjacent to the exhaust gas stream. Circuitry may be provided for occasionally calibrating the signal of the measured level of particulates in order to compensate for changes which may be occasioned by different fuels.

The control circuitry includes a memory for storing open loop EGR valve control signals as a function of speed and load. Additional memory means store particulate objective signals also as a function of speed and load. The sensed exhaust gas particulate level is compared with the appropriate particulate objective signal for the development of an error signal, which error signal is then used in an adaptive manner to adjust the open loop EGR control signal in a direction to diminish the particulate error signal. Such adaptive control of the EGR control signal as a function of the exhaust gas particulate level is further advantageous because a predeterminable relationship exists between exhaust particulate levels and $NO_x$ levels as a function of percent EGR. For depressed engine temperatures, as at start, provision is made for inhibiting EGR control.

BEST MODE FOR CARRYING OUT THE INVENTION

Figure 1:
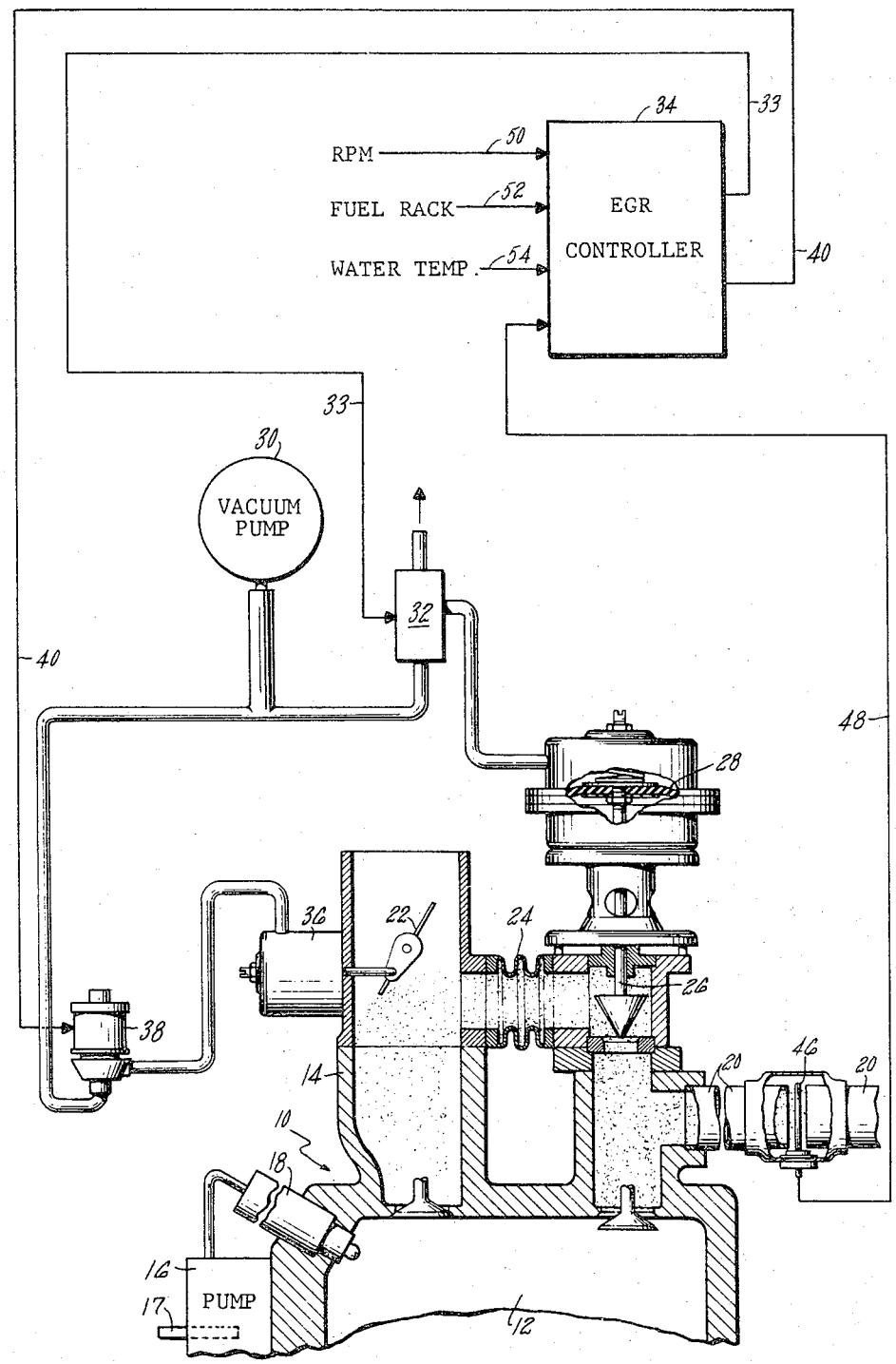
FIG. 1 is diagrammatic representation of an exhaust gas recirculation system in accordance with the present invention.

Referring to FIG. 1 there is illustrated an EGR control system used with an internal combustion engine, particularly a compression ignition or diesel engine 10, only one combustion chamber 12 of which is illustrated herein. In a known manner air is inducted through the intake manifold 14 for combustion within chamber 12 upon the time injection thereinto of fuel by means of injection pump 16 and a respective injector 18. The pump 16 includes a movable fuel quantity adjusting device, such as rack 17. Subsequently the combustion gases are exhausted from engine 10 via exhaust duct 20. It will be understood that engine 10 is typically a multi-cylinder engine, and an intake manifold and an exhaust manifold each common to the several cylinders are provided. A two-position, normally open, throttle 22 is positioned in the air intake duct 14 for reducing the inlet manifold air pressure, thereby enhancing induction of recirculated exhaust gases.

As is known, an EGR duct 24 extends from the exhaust manifold or duct 20 to the intake duct or manifold 14 just downstream of the throttle 22. An EGR valve 26 is operatively positioned in a known manner in the EGR duct 24 to selectively and finely control the amount of exhaust gas recirculated to the intake duct 14. The positioning of the EGR valve 26 may be effected by any of several suitable actuators, a vacuum-operated actuator 28 being illustrated in the present embodiment. An engine-driven vacuum pump 30 supplies a source of predetermined vacuum, which vacuum is modulated by a duty cycle modulated solenoid valve 32 for utilization in controlling the actuator 28 of EGR valve 26. The solenoid valve 32 is controlled by an EGR control signal 33 applied thereto via line 33 from the electronic control 34. Additionally, the intake throttle 22 is controlled by a pneumatic actuator 36 to which a control vacuum pressure is applied via a throttle flap electrovalve 38. Modulation of the electrovalve 38 is provided by a control signal extended thereto on line 40 from the controller 34. Actuator 36 responds to the control signal on line 40 to move the throttle 22 to either one of two positions, normally fully open or partially closed. On the other hand, the modulated solenoid valve 32 associated with the actuator 28 for EGR valve 26 may be controlled by the signal on line 33 in a manner affording positioning of the EGR valve in a continuous manner between a fully open and fully closed limit.

Figure 2:
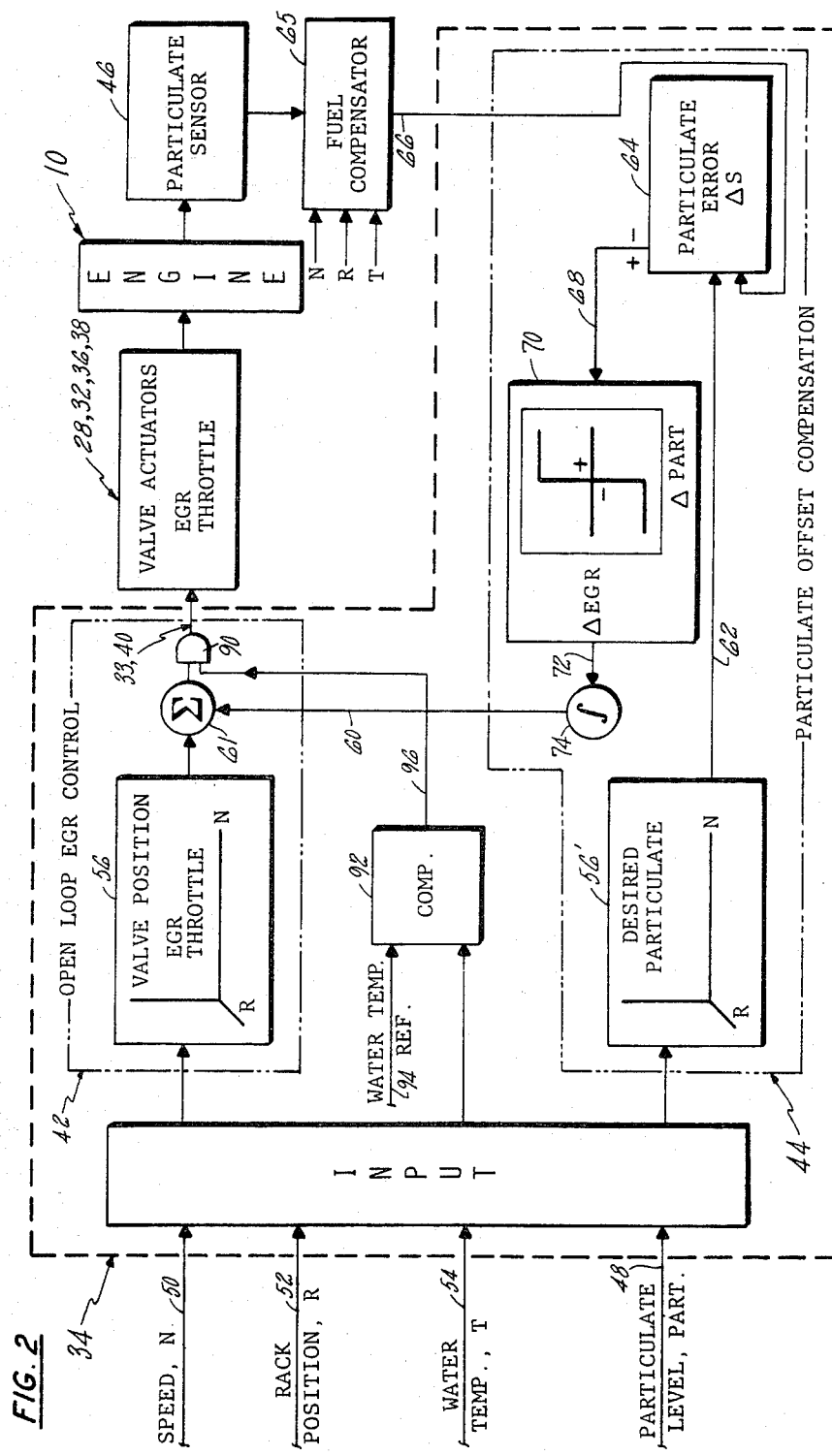
FIG. 2 is a schematical block diagram of the control for the actuators of the present EGR system.

Beyond the traditional function of an EGR control system to restrict the $NO_x$ level in the exhaust gases, the control system of the present invention optimizes the use of EGR at various operating conditions so as to also maintain the level of particulates emitted in the exhaust gas within prescribed limits. In accordance with the present invention and referring additionally to FIG. 2, the electronic controller 34 is suitably provided by a microprocessor or microcomputer including appropriate input and output signal conditioning circuitry and appropriate signal storage capacity. Referring to FIG. 2, the controller 34 specifically includes an open loop control, represented by block diagram 42, and an adaptive correction loop 44 to provide offset compensation to the primary control of open loop 42 as a function of the measured level of particulate emissions in the engine exhaust gas stream. In this latter respect, a suitable particulate sensor 46 is mounted in operative association with the exhaust gas stream in exhaust duct 20 for providing an electrical signal representative of the level of particulates being emitted by the engine.

Figure 3:
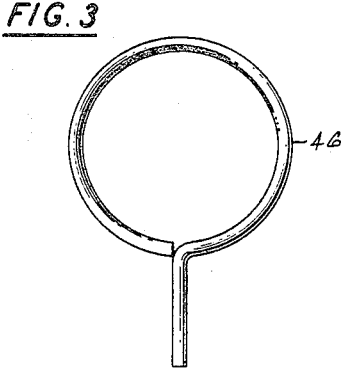
FIG. 3 is illustrative of the form of one particulate sensor useful in conjunction with the present control system.

Referring to FIG. 3, there is illustrated one preferred arrangement of an exhaust gas particulate sensor 46. A detailed explanation of this particulate sensor may be found in U.S. application Ser. No. 432,501 entitled Method And Apparatus For Indicating An Operating Characteristic Of An Internal Combustion Engine by Bullis et al, which application was filed on even date and is commonly owned herewith and is incorporated herein by reference. Briefly, the particulate sensor 46 is an annular electrode which is preferably electrically passive and is positioned such that most or all of the exhaust gas stream flows concentrically therethrough and therepast. Operation of sensor 46 is based on the principle that the particulates in the exhaust gas stream are electrically charged, and a measurement of this charge passage provides a measurement of the particulate level in the gas stream. More specifically, the charged particles in the exhaust gas stream are grouped in packets as a result of the successive discrete combustion events occurring in the engine, and the pulsating signal current induced in the particulate sensor 46 is quantitatively indicative of the charged particles in a packet and of the timing of the passage of the packet. The discrete signal pulsations associated with the passage of each packet are time-averaged, by suitable circuitry not shown, to provide a signal which is directly representative of the average level of particulates in the exhaust gas stream at the moment. Typically the current induced in the sensor 46 by the passage of the particulate packets is extended via line 48 to suitable signal development and input circuitry associated with the controller 34, though that signal development circuitry might alternately be located in proximity with the sensor. Although the sensor configuration illustrated in FIG. 3 is preferred, it will be understood that other types and forms of exhaust gas particulate sensors may be suitably employed to provide the particulate level signal to the controller 34. A root mean square averaging of the pulsating signal induced by the passage of respective particulate packets provides a substantially linear indication of the particulate level in the exhaust gas stream.

In addition to the particulate level signal appearing as an input to the controller 34 on lead 48, several other engine operating condition signals are also provided as inputs. Specifically, a signal indicative of the rpm or speed of the engine 10 or pump 16 is provided on input lead 50 and a signal indicative of the position of the injection pump rack, and thus the engine load, appears as an input on lead 52. The rpm signal on lead 50 is provided by a suitable transducer, such as a magnetic pick-up (not shown) mounted to sense the rotational speed of either the engine or the pump, as by counting the teeth on the flywheel or a toothed gear. The fuel rack position signal on lead 52 is provided by a position transducer (not shown) operatively associated with the injection pump fuel rack 17 or associated linkage, or is derived from knowledge of the positon of a stepper-motor (not shown), to provide a signal which is directly indicative of the quantity of fuel injection by pump 16. The fuel rack 17 is typically controlled by a lever or the like in accordance with load or the desired torque. A further signal appearing on lead 54 as an input to the EGR control 34 provides a measure of engine temperature. More specifically, a temperature sensor (not shown) associated with the engine cooling water circuit provides a signal which substantially corresponds to the engine temperature.

The primary or open loop EGR control signal provided by the block 42 of controller 34 is obtained from a set of predetermined stored values of the EGR control signal. A number of EGR valve position control signals are stored at predetermined addresses in a read-only memory (ROM) 56 as a function of the engine operating conditions of speed, N, and load as represented by the rack position, R. Stated another way, for each of a plurality of engine speed and load conditions, there is stored in ROM 56 a respective EGR valve position control signal. The values of those EGR valve control signals are predetermined for storage in ROM 56 in an empirical manner by mapping the performance of a representative engine. The EGR valve control values will be selected such that, as a function of engine speed and load, the $NO_x$ emissions are maintained within predetermined limits.

The EGR control signal provided on line 33 from controller 34 may be of either analog or digital form and is formatted such that its duty cycle varies directly with the value of the EGR control signal. In this way, the solenoid valve 32 is duty cycle modulated to apply a continuously variable vacuum to the EGR valve actuator 28.

As illustrated in the block diagram of FIG. 2, the ROM 56 is also provided with a map of throttle position control values, also as a function of engine speed and load. Similarly, those throttle control values may be predetermined in an empirical manner and stored in the ROM. Each throttle control value is one of only two possible values, i.e, fully open or partially closed. Generally speaking, the fully open values are associated with a range of relatively low EGR control values and the partially closed throttle values are associated with the range of relatively higher EGR control values. The two-position throttle valve 22 provides the course level of control of the pressure difference between the exhaust and intake manifolds that are required to ensure that a wide range of EGR flow rates (e.g., up to 50%) can be achieved at any speed/load operating condition. Under either low-range EGR operation (throttle valve 22 full open) or high-range EGR operation (throttle valve 22 partially closed), fine control of the EGR flow rate is provided by the modulated EGR valve 26. The electrolvalve 38 for throttle 22 is either energized or de-energized by the control signal applied on lead 40 such that the throttle is either at its partially closed or full open position respectively.

Figure 5:
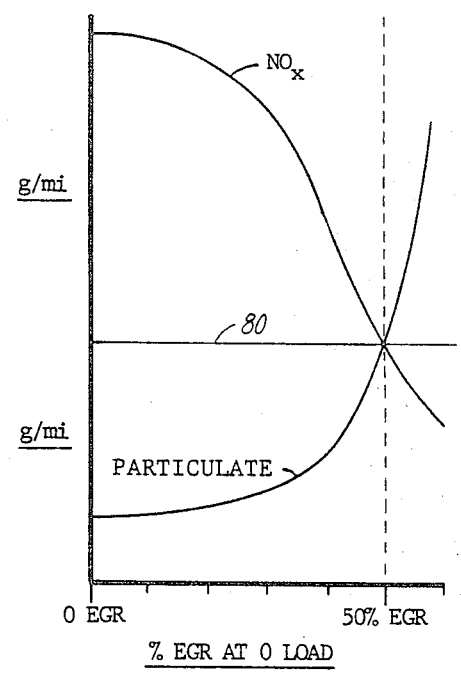
FIG. 5 is a graphical representation of the exhaust particulate and the exhaust $NO_x$ level, each as a function of percent EGR.

In accordance with the invention the primary EGR control signal provided by the open loop control 42 is subject to offset compensation as a function of the sensed level of particulate emissions in the exhaust gas stream. Such compensation is provided via an adaptive feedback or correction loop 44 which compares the actual particulate level determined by particulate sensor 46 with a predetermined desired particulate level for the existing conditions of engine speed and load and utilizes any difference therebetween for providing a compensation signal 60 which is summed with the primary EGR control signal by summer 61 to provide the final or corrected EGR control signal for output from controller 34. As in the case of the stored values of the EGR control signals, a map of predetermined desired particulate level signals is stored in ROM 56' as a function of engine speed and load. The particulate level values stored in ROM 56' are also determined empirically by performance mapping a representative engine at different conditions of speed, load and EGR conditions and within predetermined $NO_x$ emissions limits, as will be discussed hereinafter with reference to FIGS. 4 and 5.

For each operating condition of engine speed and load, a value of desired particulate level is retrievable from ROM 56' and is extended, as represented by line 62, to an input of comparator 64, the other input to which is the existing particulate level signal provided by sensor 46 on line 66. The output of comparator 64 is represented by lead 68 and comprises an error signal having a positive or negative sense, depending upon whether the actual particulate level was above or below the desired level for the particular engine operating conditions. A standardized error signal of positive or negative sense is provided in a known manner as represented by the function block designated 70. The sampling frequency of the system is such that the standardized positive or negative error signals appearing on lead 72 may then be integrated, as represented by integrator 74, to provide the EGR compensating signal 60. The EGR compensating signal 60 is then summed with the primary EGR signal at summer 61 to provide the adjusted EGR control signal which, following appropriate output conditioning, appears on line 33 extended to the EGR valve actuators.

Presently, exhaust gas smoke limits established by government and/or industry are optically-derived. Under laboratory conditions light is transmitted across the exhaust gas and the resultant scattering caused by entrained particles of 1 micron in size, and greater, is used as a measure of the exhaust gas smoke level. On the other hand, a particulate sensor 46 of the electrical charge sensing type detects both particles of 1 micron size and greater, as well as submicron sizes. Accordingly, for a given fuel, the particulate signal derived or sensed by passage of charged particles will have a constant and typically offset, relation to the optically-derived standard. Thus, the values stored in ROM 56', if based on charged particle derivation, have a constant relation to an optically-derived standard and are typically offset by some predetermined constant factor.

However, different fuels having differing amounts of aromatics will, for example, generate differing levels of particulates typically of the submicron size, which, although having little or no effect on the optically-sensed smoke value will be sensed as differing levels by the illustrated type of charged particle passage sensor. Because the optically-derived smoke values comprise the presently accepted standard, it is desirable during the course of normal vehicle operation to rescale or recalibrate the signal provided by charged-particle sensor 46, as through the use of "fuel compensation" circuitry 65.

Circuitry 65 is responsive to the initial or raw particulate signal from sensor 46, and to the speed signal N and a load signal represented by the rack position R and to an optional signal T indicative of the engine water temperature for scaling the output signal on line 66 which represents the existing level of particulates. For instance, each time the engine is operated, circuitry is operative to identify typically one specific operating condition of speed N, load R and possibly water temperature T at which the optically-derived smoke level is known to be near zero but of finite value. A reference particulate value for this operating and opacity condition will have been initially stored in circuit 65. The then-existing value of the initial or raw particulate signal from sensor 46 is compared with the reference particulate value and any difference is then used to provide an offset or scaling value which, when applied to the raw signal from sensor 46, serves to provide a calibrated output signal on line 66. Although shown separate from the controller 34, it will be understood that the "fuel compensation" circuitry 65 might be included as part of that controller.

The sense and magnitude of the correction signal 60 developed from the particulate error signal 68 is such that the resulting control of the EGR valve 26 is in a direction which acts toward minimizing or nulling the error signal appearing on output 68 from comparator 64. Because an integrator 74 is used, the compensating signal 60 will typically assume some near-steady state value which typically will be other than zero, as the error signal 68 from comparator 64 approaches a null. Moreover, because of the "bang-bang" function of block 70 in providing incremental standardized error signals, some small, tolerable amount of hunting or overshoot of the correction loop is to be expected. It will be appreciated that the integration and summing referred to herein will typically be performed digitally.

Figure 4:
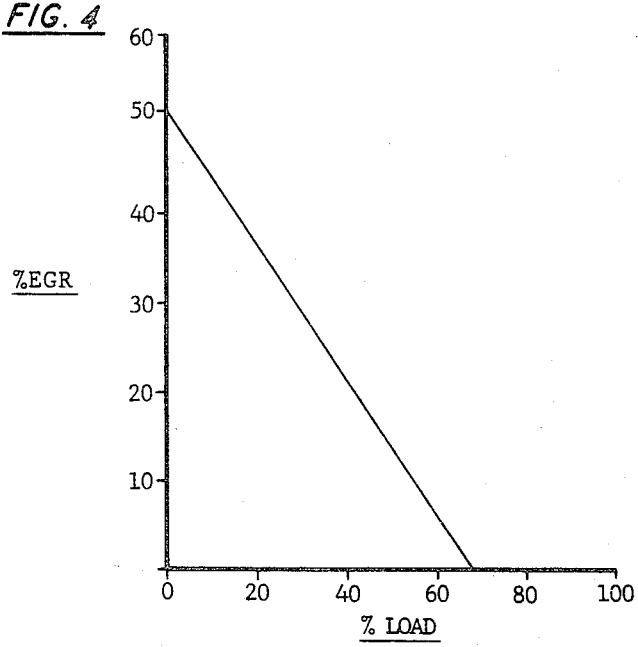
FIG. 4 is a graphical illustration of the schedule of percent EGR as a function of load for a representative diesel engine.

In determining the EGR control values to be stored in ROM 56, values are selected which will maximize, over a driving cycle, fuel economy (MPG) while meeting the emissions constraints on $NO_x$, unburned hydrocarbons, carbon monoxide and particulates. It should be understood, however, that various strategies may be employed to meet the $NO_x$ constraints while selectively minimizing particulate emissions at critical operating conditions, such as idle. It is normally always an objective to minimize the total amount of EGR utilized, in order to minimize particulate emissions. Moreover, as illustrated in the graph of FIG. 4, the percent EGR Schedule for a particulate engine as a function of load is seen to be a substantially linear decreasing function. In other words, maximum EGR is required at zero load conditions and EGR decreases substantially linearly as load increases. Further, referring to FIG. 5, the oppositely-directed functions of $NO_x$ and particulate levels, each as a function of percent EGR at zero load, are illustrated. It will be noted that $NO_x$ levels decrease with increasing EGR and conversely, particulate levels increase with increasing EGR. Although the scale indicating the units of particulate and $NO_x$ levels differ in the graphical illustration, a limit line 80 has been illustrated therein to identify a common level of maximum acceptable $NO_x$ and particulate at zero load. It will be noted that for the particular engine, 50% EGR at no load permits both requirements to be satisfied. Moreover, although not illustrated, both the carbon monoxide and unburned hydrocarbon emissions are within their respective limits. Fuel economy begins to suffer somewhat above about 40% EGR. Moreover, it will be noted that at various given engine operating conditions, the relationship between exhaust particulate level and $NO_x$ emissions is known. Thus, in accordance with the invention, by determining the particulate level it is then possible to achieve a desired $NO_x$ level by controlling to an acceptable particulate level which corresponds with that $NO_x$ level.

Briefly, the primary EGR control signal from open loop 42 is effective for obtaining a level of EGR in accordance with a predetermined map which is intended to optimize engine performance as regards the aforementioned combined emissions characteristics and fuel economy; however, the feedback control provided by the particulate offset compensation of loop 44 further acts to insure that the exhaust particulate level is maintained substantially at that dictated by the map of desired particulate level stored in ROM 56'.

Provision is also made for preventing any EGR until the engine temperature as represented by the water temperature signal 54, exceeds some minimum threshold, for instance 65° C. The adjusted EGR control signal is extended to the duty-cycle modulated valve 32 via enabling gate 90 within controller 34. The water temperature signal 54 at the input of controller 34 is extended therewithin to a comparator 92 at which it is compared with a reference signal 94 indicative of a predetermined threshold temperature. When the actual water temperature exceeds the threshold temperature, comparator 92 outputs a logic signal level which is extended via lead 96 to the control input of gate 90 to enable the gate to pass the adjusted EGR signal. When the water temperature is below the threshold, the gate 90 effectively blocks or inhibits output of the EGR signal to the valve 32, and the EGR valve is maintained closed by virtue of the particular nonvarying signal or logic state appearing at the output of gate 90.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by Letters Patent of the United States is:

1. Apparatus for controlling the recirculation of exhaust gas in a compression ignition engine having an exhaust gas recirculation duct connected between an exhaust duct from the engine and the air intake duct to the engine and valve means operatively associated with the recirculation duct and responsive to an exhaust recirculation control signal for relatively opening and closing said recirculation duct to the passage of exhaust gas therethrough, said apparatus comprising:

means adapted to be mounted in operative association with the exhaust gas stream passing through the exhaust duct from the engine for sensing the level of particulates in the exhaust gas stream and providing an output signal indicative thereof; and control signal generating means responsive to engine operating condition signals including said particulate level signal for providing said exhaust recirculation control signal, said exhaust recirculation control signal being operative to regulate said recirculation duct valve means at least partly as a function of the sensed level of particulates in the exhaust gas stream.

2. The apparatus of claim 1 including means for sensing certain engine operating conditions other than said exhaust gas particulate level and providing signals indicative of said conditions and wherein said control signal generating means includes:

first means for generating a preliminary exhaust recirculation control signal in response to and as a function of said certain engine operating condition signals;

second means for generating a desired particulate level setpoint signal;

means for comparing said output signal indicative of said sensed level of particulates with said particulate level setpoint signal and providing an error signal as a function of a difference therebetween; and compensating means responsive to said error signal for providing adjustment of said preliminary exhaust recirculation control signal thereby to provide said exhaust recirculation control signal, said adjustment of said preliminary exhaust recirculation control signal by said compensating means being toward minimizing said error signal.

3. The apparatus of claim 1 wherein the particulates in the exhaust gas stream at a sensing station downstream of the engine are electrically charged and of like polarity and said particulate level sensing means comprises a probe for electrostatically sensing the charged particles appearing at the sensing station and providing an electrical signal quantitatively indicative thereof.

4. The apparatus of claim 2 wherein the particulates in the exhaust gas stream at a sensing station downstream of the engine are electrically charged and said particulate level sensing means comprises a probe for inductively sensing the charged particulates appearing at the sensing station to provide an electrical signal quantitatively indicative thereof and fuel compensating circuit means responsive to said electrical signal and to other engine operating condition signals for calibrating said output signal.

5. The apparatus of claim 4 wherein said probe is annular and is so sized and electrically connected as to allow passage of the charged particles therethrough in substantially noncontacting manner, a pulsating signal being induced in the probe by the passage of the charged particles.

6. The apparatus of claim 5 wherein the periodicity of the combustion and valving in the engine results in the charged particles in the exhaust gas stream being grouped in packets associated with respective combustion events, the axial length of the probe being substantially less than the spacing between successive charged particle packets and wherein the induced signal substantially corresponds to the passage of respective charged particle packets and provides the quantitative indication of particulate in the exhaust gas stream.

7. The apparatus of claim 2 wherein fuel is supplied to the engine by a fuel injection pump having a movable quantity adjusting device and said certain engine operating condition signals include one signal indicative of the position of said pump quantity adjusting device and thereby engine load and another signal indicative of the rpm of the engine or pump.

8. The apparatus of claim 7 wherein said means for generating said preliminary exhaust recirculation control signal and said means for generating said desired particulate level setpoint signal comprise memory means having values of said preliminary exhaust recirculation control signal and values of said desired particulates levels stored therein, each as a function of both said pump quantity adjusting device position and the rpm of the pump or engine.

9. The apparatus of claim 7 wherein said certain engine operating signals further include a signal indicative of the temperature of the engine, and said control signal generating means further includes circuit means for inhibiting said exhaust recirculation control signal whenever said engine temperature signal is less than a predetermined threshold value.

10. The apparatus of claim 8 wherein said values of said desired particulate levels stored in said memory means are preselected to correspond with particular acceptable levels of nitrous oxide emissions for the respective said conditions of pump quantity adjusting device position and engine or pump speed.

11. The apparatus of claim 8 wherein said engine includes a throttle in the intake duct thereof and throttle actuating means responsive to a throttle control signal for relatively opening and closing said throttle, and wherein said memory means additionally stores values of said throttle control signal for selection and utilization to control actuation of said throttle as a function of both said pump quantity adjusting device position and the rpm of the pump or engine.

12. In a compression ignition engine having an exhaust gas recirculation duct connected between an exhaust duct from the engine and the air intake duct to the engine and valve means operatively associated with the recirculation duct and responsive to an exhaust recirculation control signal for relatively opening and closing said recirculation duct to the passage of exhaust gas therethrough, and wherein fuel is supplied to the engine by a fuel injection pump having a movable quantity adjusting device, the method for controlling the recirculation of exhaust gas comprising the steps of:

sensing the particulates in the exhaust gas stream passing through the exhaust gas duct from the engine and providing an output signal indicative of the particulate level;

providing other signals indicative of engine operating conditions including a signal indicative of the position of said pump quantity adjusting device and thereby engine load and a signal indicative of the rpm of the engine or pump; and generating an exhaust recirculation control signal in response to said other signals and to said particulate level signal.

13. The method of claim 12 wherein said step of generating said exhaust recirculation control signal comprises:

providing a preliminary exhaust recirculation control signal in response to and as a function of said other signals;

providing a desired particulate level setpoint signal;

comparing said output signal indicative of said sensed level of particulates with said desired particulate level setpoint signal to provide an error signal as a function of a difference therebetween; and adjusting said preliminary exhaust recirculation signal as a function of said error signal to provide said exhaust recirculation signal, said adjusting of said preliminary exhaust recirculation signal being toward minimizing said error signal.

* * * * *